United States Patent
Bailey et al.

(10) Patent No.: US 8,959,165 B2
(45) Date of Patent: Feb. 17, 2015

(54) ASYNCHRONOUS MESSAGING TAGS

(75) Inventors: Mark Bailey, Glendora, CA (US);
James E. Christensen, Cortlandt Manor, NY (US); Jason B. Ellis, New York, NY (US); Robert G. Farrell, Cornwall, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/608,078

(22) Filed: Sep. 10, 2012

(65) Prior Publication Data

US 2013/0005366 A1      Jan. 3, 2013

Related U.S. Application Data

(63) Continuation of application No. 13/052,501, filed on Mar. 21, 2011.

(51) Int. Cl.
*G06F 15/16*     (2006.01)
*G06Q 30/02*     (2012.01)

(52) U.S. Cl.
CPC .................................. *G06Q 30/0207* (2013.01)
USPC ....................................................... 709/206

(58) Field of Classification Search
USPC ................................................ 709/206, 204
See application file for complete search history.

(56) References Cited

U.S. PATENT DOCUMENTS

| | | | |
|---|---|---|---|
| 1,191,425 A * | 7/1916 | Yoshiyasu | ........................ 108/43 |
| 4,592,085 A | 5/1986 | Watari et al. | |
| 5,390,278 A | 2/1995 | Gupta et al. | |
| 5,422,816 A * | 6/1995 | Sprague et al. | ............. 455/556.2 |
| 6,718,368 B1 | 4/2004 | Ayyadurai | |
| 6,834,270 B1 | 12/2004 | Pagani et al. | |
| 6,879,257 B2 | 4/2005 | Hisano et al. | |
| 6,970,935 B1 * | 11/2005 | Maes | ............................ 709/230 |
| 7,003,570 B2 * | 2/2006 | Messinger et al. | ............. 709/226 |
| 7,047,027 B2 | 5/2006 | Jeon | |
| 7,065,544 B2 | 6/2006 | Moreno | |

(Continued)

FOREIGN PATENT DOCUMENTS

| | | |
|---|---|---|
| CA | 2493180 A1 | 7/2005 |
| CN | 1852354 A | 10/2006 |

(Continued)

OTHER PUBLICATIONS

International Preliminary Report on Patentability for International Patent Application No. PCT/US2011/023557; International Filing Date: Feb. 3, 2011; 5 pages.

(Continued)

*Primary Examiner* — Kevin Bates
*Assistant Examiner* — Clarence D McCray
(74) *Attorney, Agent, or Firm* — Cantor Colburn LLP; Preston Young

(57) ABSTRACT

A method includes receiving a message from a user device, determining whether the message includes a tag, identifying at least one interaction the user device performed with an application responsive to determining that the message includes the tag, calculating a difference between a time the message was received and a time associated associated with the at least one interaction responsive to determining that the difference between the time the message was received and the time associated with the at least one identified interaction is within the threshold value.

5 Claims, 5 Drawing Sheets

(56) References Cited

U.S. PATENT DOCUMENTS

| | | | |
|---|---|---|---|
| 7,151,490 B2* | 12/2006 | Richards | 342/458 |
| 7,163,151 B2 | 1/2007 | Kiiskinen | |
| 7,177,795 B1 | 2/2007 | Chen et al. | |
| 7,209,949 B2* | 4/2007 | Mousseau et al. | 709/206 |
| 7,225,249 B1* | 5/2007 | Barry et al. | 709/227 |
| 7,228,228 B2* | 6/2007 | Bartlett et al. | 701/517 |
| 7,263,597 B2 | 8/2007 | Everdell et al. | |
| 7,266,754 B2 | 9/2007 | Shah et al. | |
| 7,337,115 B2 | 2/2008 | Liu et al. | |
| 7,512,659 B2* | 3/2009 | Keohane et al. | 709/206 |
| 7,529,675 B2* | 5/2009 | Maes | 704/270.1 |
| 7,551,935 B2 | 6/2009 | Karmakar | |
| 7,634,528 B2* | 12/2009 | Horvitz et al. | 709/200 |
| 7,650,376 B1 | 1/2010 | Blumenau | |
| 7,673,796 B2* | 3/2010 | Kobres et al. | 235/383 |
| 7,693,945 B1* | 4/2010 | Dulitz et al. | 709/206 |
| 7,729,689 B2 | 6/2010 | Chakraborty et al. | |
| 7,886,083 B2* | 2/2011 | Pinkerton et al. | 710/17 |
| 7,917,911 B2* | 3/2011 | Bansal et al. | 719/313 |
| 7,970,923 B2* | 6/2011 | Pedersen et al. | 709/231 |
| 8,209,620 B2 | 6/2012 | Dempski et al. | |
| 8,290,479 B2* | 10/2012 | Aaron et al. | 455/418 |
| 8,380,798 B2* | 2/2013 | Jackson et al. | 709/206 |
| 8,438,553 B2* | 5/2013 | Komatsu et al. | 717/151 |
| 8,539,542 B1 | 9/2013 | Elhag et al. | 725/135 |
| 2002/0138582 A1* | 9/2002 | Chandra et al. | 709/206 |
| 2002/0165961 A1 | 11/2002 | Everdell et al. | |
| 2003/0009385 A1* | 1/2003 | Tucciarone et al. | 705/26 |
| 2003/0031309 A1 | 2/2003 | Rupe et al. | |
| 2003/0033394 A1 | 2/2003 | Stine | |
| 2003/0115366 A1* | 6/2003 | Robinson | 709/248 |
| 2003/0120822 A1 | 6/2003 | Langrind et al. | |
| 2003/0182421 A1 | 9/2003 | Faybishenko et al. | |
| 2004/0019648 A1 | 1/2004 | Huynh et al. | |
| 2004/0022264 A1 | 2/2004 | McCue | |
| 2004/0024817 A1 | 2/2004 | Pinkas | |
| 2004/0260551 A1 | 12/2004 | Atkin et al. | |
| 2005/0010573 A1 | 1/2005 | Garg | |
| 2005/0038660 A1 | 2/2005 | Black et al. | |
| 2005/0060372 A1* | 3/2005 | DeBettencourt et al. | 709/206 |
| 2005/0060381 A1 | 3/2005 | Huynh et al. | |
| 2005/0102625 A1 | 5/2005 | Lee et al. | |
| 2005/0114357 A1 | 5/2005 | Chengalvarayan et al. | |
| 2005/0152406 A2* | 7/2005 | Chauveau | 370/503 |
| 2005/0171768 A1 | 8/2005 | Gierach | |
| 2005/0192808 A1 | 9/2005 | Sugiyama | |
| 2005/0198270 A1* | 9/2005 | Rusche et al. | 709/224 |
| 2006/0015339 A1 | 1/2006 | Charlesworth et al. | |
| 2006/0036441 A1 | 2/2006 | Hirota | |
| 2006/0109976 A1 | 5/2006 | Sundaram et al. | |
| 2006/0155854 A1 | 7/2006 | Selgert | |
| 2006/0287867 A1 | 12/2006 | Cheng et al. | |
| 2007/0008069 A1* | 1/2007 | Lastinger et al. | 340/10.1 |
| 2007/0019793 A1 | 1/2007 | Cheng | |
| 2007/0025543 A1 | 2/2007 | Vadlakonda et al. | |
| 2007/0033229 A1 | 2/2007 | Fassett et al. | |
| 2007/0078986 A1* | 4/2007 | Ethier et al. | 709/227 |
| 2007/0171066 A1 | 7/2007 | Fein et al. | |
| 2007/0174326 A1 | 7/2007 | Schwartz et al. | |
| 2007/0192422 A1 | 8/2007 | Stark et al. | |
| 2007/0237135 A1 | 10/2007 | Trevallyn-Jones et al. | |
| 2007/0290787 A1 | 12/2007 | Fiatal et al. | |
| 2008/0004056 A1 | 1/2008 | Suzman | |
| 2008/0057922 A1 | 3/2008 | Kokes et al. | |
| 2008/0075433 A1 | 3/2008 | Gustafsson | |
| 2008/0083024 A1 | 4/2008 | Glazer et al. | |
| 2008/0091723 A1 | 4/2008 | Zuckerberg et al. | |
| 2008/0134205 A1 | 6/2008 | Bansal et al. | |
| 2008/0155534 A1 | 6/2008 | Boss et al. | |
| 2008/0159266 A1 | 7/2008 | Chen et al. | |
| 2008/0162132 A1 | 7/2008 | Doulton | |
| 2008/0233977 A1 | 9/2008 | Xu et al. | |
| 2008/0233981 A1 | 9/2008 | Ismail | |
| 2009/0012841 A1 | 1/2009 | Saft et al. | |
| 2009/0031006 A1 | 1/2009 | Johnson | |
| 2009/0037515 A1 | 2/2009 | Zapata et al. | |
| 2009/0062949 A1 | 3/2009 | Heo et al. | |
| 2009/0094190 A1 | 4/2009 | Stephens | |
| 2009/0099906 A1 | 4/2009 | Kirley et al. | |
| 2009/0125595 A1 | 5/2009 | Maes | |
| 2009/0128335 A1 | 5/2009 | Leung | |
| 2009/0131080 A1 | 5/2009 | Nadler et al. | |
| 2009/0131087 A1 | 5/2009 | Johan | |
| 2009/0150501 A1 | 6/2009 | Davis et al. | |
| 2009/0150786 A1 | 6/2009 | Brown | |
| 2009/0164287 A1 | 6/2009 | Kies et al. | |
| 2009/0186641 A1 | 7/2009 | Vaananen | |
| 2009/0191902 A1 | 7/2009 | Osborne | |
| 2009/0199114 A1 | 8/2009 | Lewis et al. | |
| 2009/0210226 A1 | 8/2009 | Ma | |
| 2009/0216805 A1 | 8/2009 | Coffman et al. | |
| 2009/0265631 A1 | 10/2009 | Sigurbjornsson | |
| 2009/0270068 A1 | 10/2009 | Ahopelto et al. | |
| 2009/0271380 A1 | 10/2009 | Julia et al. | |
| 2009/0276488 A1* | 11/2009 | Alstad | 709/203 |
| 2010/0015956 A1 | 1/2010 | Qu et al. | |
| 2010/0023451 A1 | 1/2010 | Lambert et al. | |
| 2010/0023475 A1* | 1/2010 | Lahav | 706/59 |
| 2010/0023506 A1 | 1/2010 | Sahni et al. | |
| 2010/0030578 A1* | 2/2010 | Siddique et al. | 705/3 |
| 2010/0048242 A1 | 2/2010 | Rhoads et al. | |
| 2010/0049599 A1 | 2/2010 | Owen et al. | |
| 2010/0087172 A1 | 4/2010 | Klassen et al. | |
| 2010/0122331 A1 | 5/2010 | Wang et al. | |
| 2010/0128335 A1 | 5/2010 | Maeda et al. | |
| 2010/0158236 A1 | 6/2010 | Chang et al. | |
| 2010/0174622 A1 | 7/2010 | Sohn et al. | |
| 2010/0201845 A1 | 8/2010 | Feinberg et al. | |
| 2010/0210248 A1 | 8/2010 | Morrissey et al. | |
| 2010/0211868 A1 | 8/2010 | Karmarkar et al. | |
| 2010/0287197 A1 | 11/2010 | Wang et al. | |
| 2010/0296646 A1* | 11/2010 | Hemm et al. | 379/265.02 |
| 2010/0318859 A1* | 12/2010 | Augusto et al. | 714/57 |
| 2011/0021178 A1 | 1/2011 | Balasaygun et al. | |
| 2011/0035284 A1 | 2/2011 | Moshfeghi | |
| 2011/0061068 A1 | 3/2011 | Ali et al. | |
| 2011/0072015 A1 | 3/2011 | Lin et al. | |
| 2011/0077941 A1 | 3/2011 | Dey et al. | |
| 2011/0145356 A1 | 6/2011 | Tanner | |
| 2011/0153723 A1* | 6/2011 | Mutnuru et al. | 709/203 |
| 2011/0153839 A1 | 6/2011 | Rajan et al. | |
| 2011/0212736 A1 | 9/2011 | Jaime et al. | |
| 2011/0219018 A1 | 9/2011 | Bailey et al. | |
| 2011/0221960 A1 | 9/2011 | Glaznev et al. | |
| 2011/0231747 A1 | 9/2011 | Zuckerberg et al. | |
| 2011/0244887 A1* | 10/2011 | Dupray et al. | 455/456.2 |
| 2011/0246560 A1 | 10/2011 | Gibson | |
| 2011/0276513 A1 | 11/2011 | Erhart et al. | |
| 2012/0134548 A1 | 5/2012 | Rhoads et al. | |
| 2012/0246238 A1* | 9/2012 | Bailey et al. | 709/206 |
| 2012/0266102 A1 | 10/2012 | Dempski et al. | |
| 2013/0100301 A1 | 4/2013 | Rhoads | |
| 2013/0166332 A1* | 6/2013 | Hammad | 705/5 |
| 2014/0111354 A1 | 4/2014 | Hergesheimer et al. | |

FOREIGN PATENT DOCUMENTS

| | | | |
|---|---|---|---|
| EP | 1340096 | * | 9/2003 |
| GB | 2396520 A | | 6/2004 |
| GB | 2461730 A | | 1/2010 |
| WO | 2005025155 A1 | | 3/2005 |
| WO | WO 2006/127791 | * | 11/2006 |
| WO | 2007086683 A1 | | 8/2007 |
| WO | 2008026945 A1 | | 3/2008 |
| WO | 2009012516 A1 | | 1/2009 |
| WO | WO 2009135292 A1 | * | 11/2009 |

OTHER PUBLICATIONS

Best Shareware, "SoundPix Plus", http://www.bestshareware.net/download/soundpixplus.htm, retrieved from the internet on Jan. 12, 2012, 2 pages.

Computerworld, "Facebook photo privacy PANIC: Auto-tag apology and apologia", http://blogs.computerworld.com/18435/facebook_

(56) References Cited

OTHER PUBLICATIONS photo_privacy_panic_auto_tag_apology_and_apologia, retrieved from the internet on Jan. 12, 2012, 7 pages.
Digital Photography School, "Columbus V-900 GPS Voice Photo Logger Review", http://www.digital-photography-school.com/columbus-v-900-gps-voice-photo-data-logger-review, retrieved from the internet on Jan. 12, 2012, 3 pages.
Google Image Labeler, http://en.wikipedia.org/wiki/Google_Image_Labeler, Aug. 31, 2006, 4 pages.
Mobile Phones "Nokia patents voice tagging of hotos", http://www.mobilephones.org.uk/nokia/nokia-patents-voice-tagging-of-photos/, retrieved from the internet on Apr. 12, 2012, 4 pages.
Resco.net Developer & Mobile Enterprise, "How to use mobile devices camera and microphone in business applications", http://www.resco.net/developer/company/articles.aspx?file=articles/article14, retrieved from the internet on Jan. 12, 2012, 6 pages.
"Sentiment140", http://help.sentiment140.com/, retrieved from Internet May 8, 2012, 2 pages.
The Stanford Natural Language Processing Group, "Stanford Log-linear Part-of_Speech Tagger", http://npl.stanford.edu/software/tagger.shtml, retrieved from the Internet on Apr. 11, 2012, 3 pages.
Blackwell T., "Fast Decoding of Tagged Message Formats," Proceeding IEEE INFOCOM '96, Mar. 24-28, 1996, Copyright 1996 IEEE, pp. 224-231.
Office Action—Non-final; dated Mar. 15, 2012 for U.S. Appl. No. 12/718,041.
IBM et al., "Apparatus for Sending a Sequence of Asynchronous Messages Through the Same Channel in a Messaging Middleware Cluster," Published Oct. 4, 2005, Copyright IP.com, Inc., pp. 1-7.
Dey, Anind K. et al., "CybreMinder: A Context Aware System for Supporting Reminders," HUC 2000, LNCS 1927, pp. 172-186, 2000.
ACM Digital Library, [online]; [retrieved on Mar. 14, 2011]; retrieved from the Internet http://portal.acm.org/citation.cfm?id=1670452 Alberto Gonzalez Prieto et al.,"Adaptive Performance Management for SMS Systems," Journal of Network and Systems Management; vol. 17 Issue 4, Dec. 2009.
NMS Adaptive, [online]; [retrieved on Mar. 14, 2011]; retrieved from the Internet http://www.nms-adaptive.com/products/pages/desktop-sms-frameset.htm.
Carnegie Mellon University, [online]; [retrieved on Mar. 14, 2011]; retrieved from the Internet http://citeseerx.ist.psu.edu/viewdoc/download?doi=10.1.1.70.4047&rep=rep1&type=pdf Daniel Siewiorek et al.,"SenSay: A Context-Aware Mobile Phone," 2003.
The Symbian Blog [online]; [retrieved on Mar. 15, 2011]; retrieved from the Internet http://www.symbianzone.co.cc/2010/08/sms-tag-v10-sms-organizer-symbian-os-94.html Symbian SMS Tag Organizer; 2010.
AdaptiveMobile [online]; [retrieved on Mar. 15, 2011]; retrieved from the Internet http://www.adaptivemobile.com 2011.
International Search Report; International Application No. PCT/US11/23557; International Filing Date: Feb. 3, 2011; Date of Mailing: Apr. 4, 2011.
International Search Report—Written Opinion; International Application No. PCT/US11/23557; International Filing Date: Feb. 3, 2011; Date of Mailing: Apr. 4, 2011.
Zhumatiy, V. et al., "Metric State Space Reinforcement Learning for a Vision-Capable Mobile Robot," Technical Report; IDSIA; Mar. 2006.
Ricci et al., "Acquiring and Revising Preferences in a Critique-Based Mobile Recommender System," May/Jun. 2007, vol. 22, No. 3, IEEE Computer Society, Copyright 2007 IEEE.
Bae et al., "TagReel: A Visualization of Tag Relations among User Interests in the Social Tagging System", 2009 Six International Conference on Computer Graphics, Imaging and Visualization, IEEE Computer society, 2009, pp. 437-442.
Hosy, Marc, Indexing/Labeling?Enhancing digital pictures using Voice Tags/Commands/Comments, www.ip.com, IP.com electronic| IPCOM000169425D; Publication Apr. 22, 2008; 3 pages.

* cited by examiner

300

301
303

| Application Usage | | | |
|---|---|---|---|
| Application ID | User ID | Last User Interaction | User Location |
| A1 | U1 | 1400-1-1-2011 | 30040 |
| A2 | U1 | 1403-1-1-2011 | 30040 |
| A2 | U2 | 1402-1-1-2011 | 30309 |
| | | | |
| | | | |

| Application | |
|---|---|
| Application ID | Application Description |
| A1 | Recipe Application |
| A2 | Coupon Application |
| | |
| | |
| | |

| Tags | |
|---|---|
| Application ID | Tag |
| A1 | Market |
| A2 | Market |
| A1 | Groceries |
| | |
| | |
| | |

ASYNCHRONOUS MESSAGING TAGS

CROSS-REFERENCE TO RELATED APPLICATIONS

This is a continuation application of and claims priority from U.S. application Ser. No. 13/052,501, filed on Mar. 21, 2011, the entire contents of which are incorporated herein by reference.

BACKGROUND

The present invention relates to asynchronous messaging, and more specifically, to tags associated with asynchronous messaging.

Though the functions of available mobile telephone devices continue to advance, there are significant numbers of users who utilize mobile telephone devices with limited functions or features. For example, millions of mobile telephone device users use simple mobile telephone devices with voice and texting/short message service (SMS), but with limited alternative communications features.

BRIEF SUMMARY

According to one embodiment of the present invention, a method includes receiving a message from a user device, determining whether the message includes a tag, identifying at least one interaction the user device performed with an application responsive to determining that the message includes the tag, calculating a difference between a time the message was received and a time associated with the at least one identified interaction, determining whether the difference between the time the message was received and the time associated with the at least one identified interaction is within a threshold value, and associating the tag with the application associated with the at least one interaction responsive to determining that the difference between the time the message was received and the time associated with the at least one identified interaction is within the threshold value.

According to another embodiment of the present invention, a method includes receiving a message from a user device, determining whether the message includes a tag, identifying at least one interaction the user device performed with an application responsive to determining that the message includes the tag, calculating a distance between a location the message was sent from and a location associated with the at least one identified interaction, determining whether the distance between the location the message was sent from and the location associated with the at least one identified interaction is within a threshold value, and associating the tag with the application associated with the at least one interaction responsive to determining that the distance between the location the message was sent from and the location associated with the at least one identified interaction is within the threshold value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 illustrates an application usage table.

FIG. 4 illustrates an application table.

FIG. 5 illustrates a tag table.

DETAILED DESCRIPTION

In many mobile telephone service areas, some users may utilize voice features and texting or SMS features, but may not use other data services due to device or network limitations, or the cost of wireless data transmission over the networks. The illustrated embodiments described below allow a user to interact with a server in a session to perform a variety of tasks using text messaging or voice messaging features. The interaction is asynchronous because the session includes messages sent from a user device to a server or from a server to a user device without a constant connection (i.e., the communicative connection between the server and the device is defined by individual discrete messages sent between the server and the device.) Though the illustrated embodiments describe texting or SMS services, one of ordinary skill in the art would understand that any type similar messaging service including e-mail and instant messaging or voice messaging, which may be in some embodiments converted to textual messages or processed with voice recognition methods may be used in a similar manner as described below.

Tagging is a term used to describe assigning metadata to a data object, session, content or service. Tags often include, for example, a word or phrase that is associated with data to describe the data. Thus, for example, tags such as "apples," "produce," or "fruit" may be associated with a session that is associated with a recipe for a salad. In practice, the tags may be used to search for data or identify data having particular tags. Often, tags may be entered and retrieved by users of a tagging system.

Figure 1:
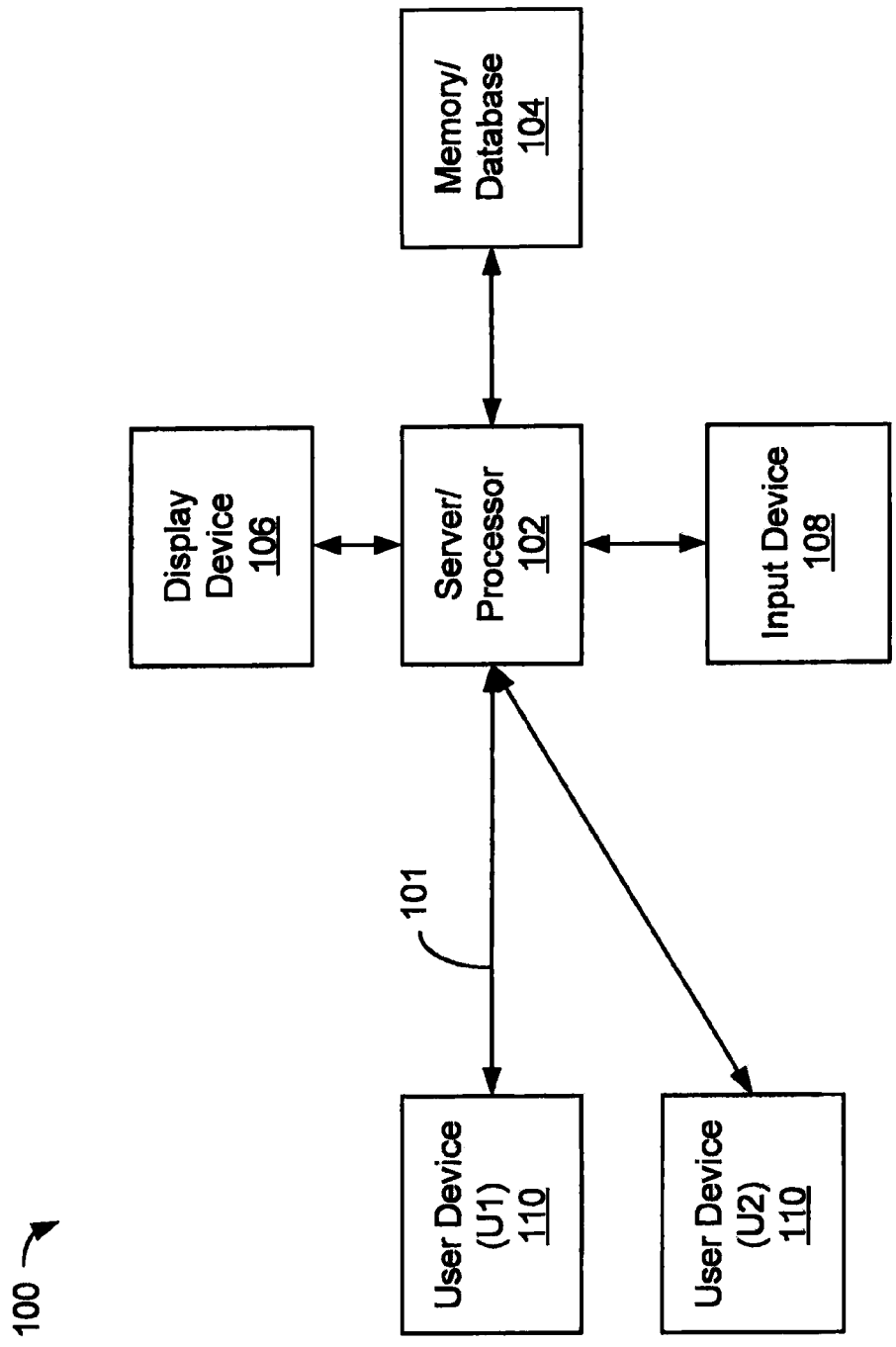
FIG. 1 illustrates an exemplary embodiment of a system.

In this regard, FIG. 1 illustrates an exemplary embodiment of a system 100. The system 100 includes a server or processor 102 that is communicatively connected to a memory or database 104, a display device 106, and an input device 108. The server 102 is communicatively connected to a user device 110 that may include, for example, a mobile phone or other type of user device via a communications network 101 that may include, for example any suitable communications network that is capable of transmitting messages. The network 101 may also include conversion or gateway devices that are operative to convert messages and data into formats that may be processed by, the user device 110 and the server 102. Though the illustrated embodiment includes one user device 110, the system 100 may include any number of user devices 110. The server 102 is operative to receive messages sent from the user device 110 that may be addressed to one or more phone numbers associated with the server 102. For example, the user device may send a message to the server 102 by addressing the message to a particular phone number. The server 102 receives the message that includes the phone number of the sender; the phone number that the message was sent to; and the content of the message. The message may also include the time the message was sent, the location of the user device when the message was sent, or other information associated with the user device or message content. Though the illustrated embodiment includes the use of SMS messages and associated phone numbers, one of ordinary skill in the art would understand that a similar scheme may be implemented using other types of asynchronous messaging such as, for example, email or other messaging formats.

Figure 2:
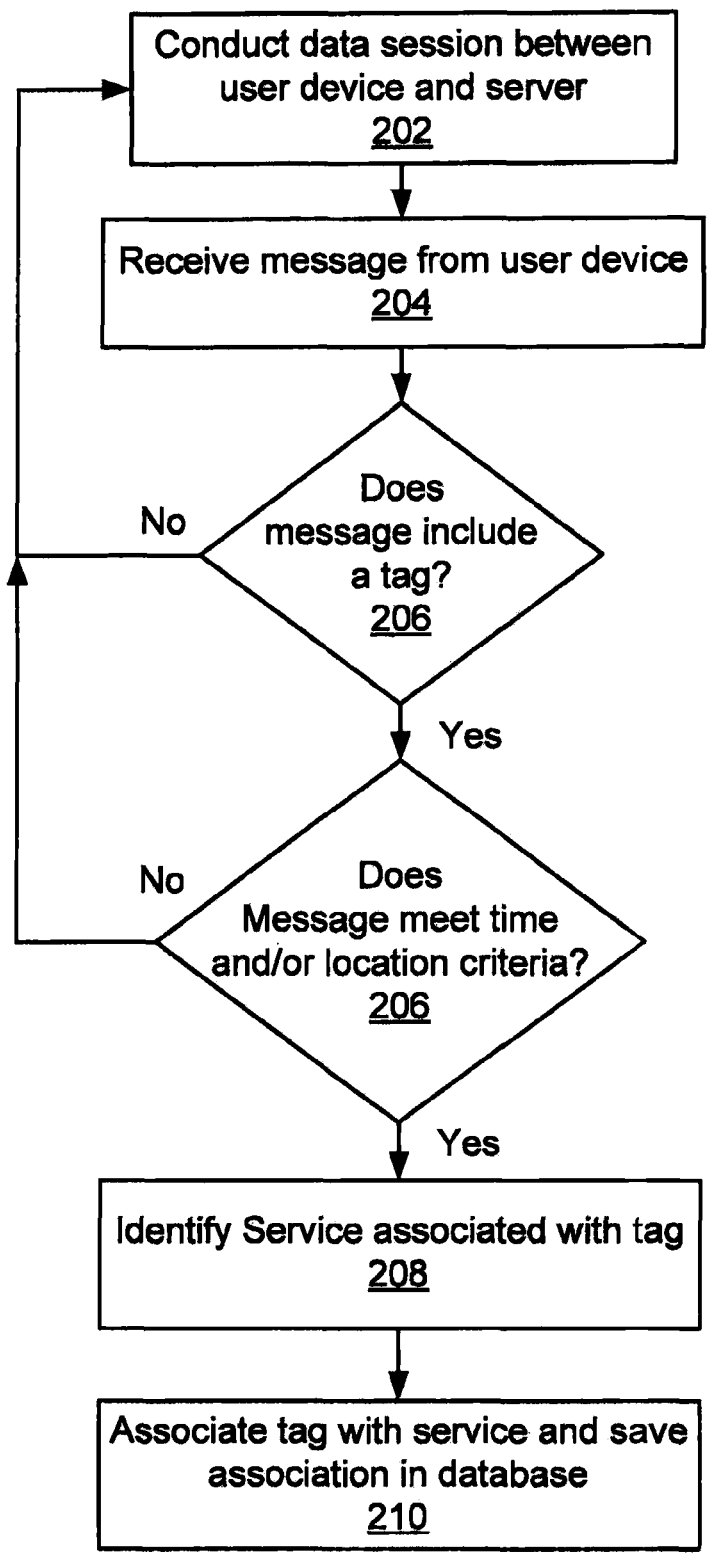
FIG. 2 illustrates a block diagram of an exemplary method for processing tags.

FIG. 2 illustrates a block diagram of an exemplary method for processing tags in an asynchronous data session. FIGS. 3-5 illustrate exemplary embodiments of tables that may be used in the illustrated method. The tables 300, 400, and 500 may be stored in the database 104 and maintained by the server 102. Referring to FIG. 2, in block 202 an asynchronous data session is conducted between the user device 110 (of FIG. 1) and the server 102. The session may include, for example, a series of messages sent between the user device 110 and the server 102. In the illustrated embodiment, the sessions include the use of a recipe application (A1) and a coupon application (A2). In this regard, in an exemplary session, a user (U1) looks up a recipe for pancakes from the recipe application by sending a message to the server 102 from the user device 110. The server receives the message and sends a message having a recipe for pancakes to the user. Later, the user interacts with the coupon application to retrieve a coupon for an item the user is purchasing. The coupon application sends a message via the server 102 to the user device 110 that includes the relevant coupon information. During the sessions described above, the tables in FIGS. 3 and 4 are populated.

Referring to FIG. 4, table 400 includes an application table having an application ID field 402 that includes unique identifiers of applications and an application description field 404 that includes descriptions of the applications associated with the application identifiers. Referring to FIG. 3, table 300 includes an application usage table having an application ID field 302 that includes the unique identifier of an application, a user ID field 304 that includes a unique identifier of the user and/or user device 110, a last user interaction field 306 that includes a time stamp of the last interaction the user had with the associated application, and a user location field 308 that may include a location of the user or user device 110 during the associated interaction. Referring back to FIG. 2, in block 202 the session the table 300 is populated with the user interactions, for example, the interaction described above with the recipe application is entered into the table 300 in entry 301, while the interaction described above with the coupon application is entered into the table 300 in entry 303. The entries in the table 300 may include a user location that may be, for example, based on a global positioning system (GPS) or other type of location scheme used by the user device 110 to locate a position of the device. Thus, the messages processed by the server 102 may include location data that identifies a location where the user device 110 sent a message. In the illustrated embodiment, the table 300 includes zip codes, however other location data including, for example, GPS coordinates or other similar location data may also be used.

Figure 6:
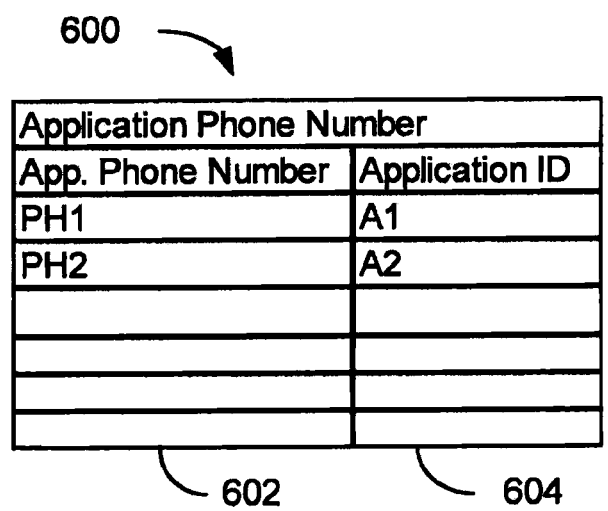
FIG. 6 illustrates an application phone number table.

In block 204, the server 102 receives a message from the user device 110. In block 206, the server determines whether the message includes a tag. The server 102 may make the determination by, for example, determining whether the message includes an indicator such as a word or phrase (e.g. "Tag:"). Alternatively, a phone number may be associated with tagging, such that the user enters tags into a message and sends the message to the phone number associated with tagging. Other alternatives are possible, such as, for example, text analysis of the message to extract words or phrases. Tags may be part of reviews or comments added during or after an activity. The server 102 receives the message addressed to the phone number associated with tagging and thus, identifies the data in the message as being tags. If the message includes a tag, a tagging service that may be implemented by the server 102 determines whether the message meets time and/or location criteria. For example, the time that the tag message was sent from may be determined by header or other information in the message. The location that the tag message was sent from may be determined from software installed on the phone (e.g., a GPS receiver) or from header information or other information in the message. The server 102 may use the message destination (phone number) from the SMS header to determine the application ID in the application phone number table 600. FIG. 6 illustrates an application phone number table 600 that includes a phone number field 602 and an application ID field 604; and is populated with entries that associate a phone number with an application ID.

The server 102 uses the user ID to determine whether table 300 (of FIG. 3) includes any application usage entries associated with the user ID. If there are application usage entries associated with the user ID (for example. A1 and A2 are associated with User ID U1 in Table 300), then the server 102 may calculate for each retrieved application usage entry, a difference between the time the tag message was sent from the user device and the last user interaction time with the application ID retrieved from Table 300 and determine whether the difference is within a time threshold (e.g., 30 minutes). Alternate embodiments may include several methods for setting the time threshold. For example, one method may determine the likely maximum time for users to tag after starting an activity. For example, 90% of users complete shopping and tag within 30 minutes. The location of the user device the tag message was sent from may alternatively, or in conjunction with the time the message was received be used to determine whether the tag message meets the location criteria. For example, the server 102 may calculate a distance between the location the tag message was sent from, and the location in the table 300 and compare the distance with a threshold distance (e.g., in a same zip code). Alternate embodiments may include a variety of ways of setting the location threshold. For example, determine the likely maximum distance across which applications for an activity might be used may be determined. For example, 90% of users are likely to tag within the same zip code as the store. Thus, the user ID, time, and/or location associated with the tag message and relevant time and/or distance thresholds may be used to identify applications (i.e., application IDs) in the table 300. In block 208, the identified application(s) are associated with the tag received in the tag message. In the illustrated example, the user U1 sends a tag message to the server 102 that includes the tag "Market." If the tag message is sent from U1 at 1405-1-1-2011 in the location 30040, the tag message would meet the criteria (i.e. is within an exemplary thirty minute time threshold, and sent from the same zip code 30040). In block 210, the applications A1 and A2 are identified and associated with the tag "Market," and the associated tag is saved. FIG. 5 illustrates a table 500 that includes an application ID field 502 and a tag field 504, which is populated in block 210 (of FIG. 2).

If the message does not contain a tag, then the user and application data are tracked in table 300. As above, the time and/or location are determined. Then they are set into the last user interaction 306 and user location 308 fields together. Alternatively, if this is the first time a message was sent to this application from this user (the user is subscribing), a new row is added.

Figure 7:
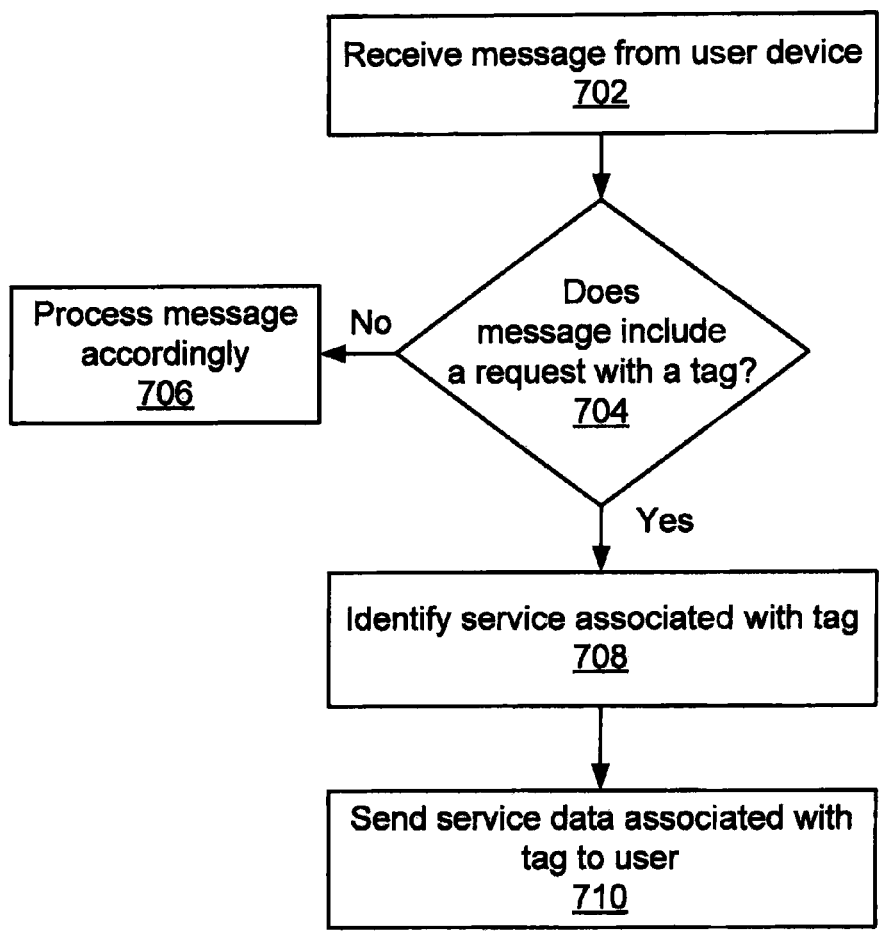
FIG. 7 illustrates a block diagram of another exemplary method for processing tags.

FIG. 7 illustrates a block diagram of an exemplary method for retrieving tags performed by the system 100. In this regard, in block 702, the server 102 receives a message from a user device 110. The message may be received from any user device 110. In block 704, the server 102 determines whether the message includes a request for data that includes a tag. For example, the user device (U2) may send a message to the server 102 that includes a request for data or applications associated with the tag "Market." If the message does not include a tag, the message may be processed for other relevant session activities in block 706. If the message does include a request for data that includes a tag, the server 102 may use the table 500 (of FIG. 5) to identify application ID(s) associated with the tag. In the illustrated embodiment, the application IDs A1 and A2 are associated with the tag "Market." In cases where user tags do not match stored tags, various text processing techniques may be used to determine a degree of match. For example, "Market" may match the tag "Markets" or "Supermarket". In block 710, the server 102 sends a message associated with the applications A1 and A2 to the user device U2 110. In the illustrated embodiment, the message may include the tagged recipe for pancakes and the coupon tagged by the user U1.

The system also allows the user to request the tags associated with a given application (the 'tag cloud'). It does this by processing a message containing this request ("tags") to the application (phone number). The server 102 then redirects this request to the tagging service. The server 102 uses table 500 to retrieve the tags associated with the application and return them to the requesting user (phone number). The tags may be ordered alphabetically. Alternatively, tags may be ordered by popularity, recency, and/or proximity.

The technical effects and benefits of the methods and systems described above, allow a user to associate tags with sessions and applications in an asynchronous messaging system. The system also allows a user to retrieve data or initiate sessions using the asynchronous messaging system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
  receiving a message from a user device at a server;
  determining that the message includes a tag;
  identifying at the server at least one prior interaction the user device performed with an application, the at least one prior interaction occurring before the message is received at the server and;
  calculating a difference between a time the message was received and a time associated with the identified at least one prior interaction with the application;
  determining whether the difference between the time the message was received and the time associated with the identified at least one prior interaction with the application is within a threshold value;
  associating the tag with the application associated with the identified at least one prior interaction responsive to determining that the difference between the time the message was received and the time associated with the identified at least one prior interaction is within the threshold value;
  identifying a second interaction the user device performed with a second application responsive to determining that the message includes the tag;
  calculating a distance between a location the message was sent from and a second location associated with the second identified interaction, the second location being different than the first;
  determining whether the distance between the location the message was sent from and the second location is within a threshold value; and
  associating the tag with the second application associated with the second interaction responsive to determining that the distance between the location the message was sent from and the second location is within the threshold value.

2. The method of claim 1, wherein the method further includes:
  calculating a difference between a time the message was received and a time associated with the second identified interaction;
  determining whether the difference between the time the message was received and the time associated with the second identified interaction is within a threshold value; and
  associating the tag with the second application associated with the second interaction responsive to determining that the difference between the time the message was received and the time associated with the second identified interaction is within the threshold value.

3. The method of claim 1, wherein the tag includes a textual word entry.

4. The method of claim 1, wherein the method further includes:
  receiving a message from at least one user device;
  determining whether the message includes a request for data associated with the tag;
  identifying the application associated with the tag responsive to determining that the message includes a request for data associated with the tag; and
  sending service data associated with the application to the user device.

5. The method of claim 1, wherein the method further includes:
  receiving a message from at least one user device;
  determining whether the message includes a request for data associated with the tag;
  identifying the applications associated with the tag responsive to determining that the message includes a request for data associated with the tag; and
  sending service data associated with the applications to the user device.

* * * * *